PROCESS FOR PRODUCING MAGNETIC THIN FILM WIRE BY MULTIPLE-LAYER ELECTRODEPOSITION

Filed Nov. 15, 1966

INVENTORS
HISAO MAEDA
AKIRA MATSUSHITA
TAKASHI SAKUMA
BY
H. Edward Mestern

United States Patent Office 3,549,508
Patented Dec. 22, 1970

3,549,508
PROCESS FOR PRODUCING MAGNETIC THIN FILM WIRE BY MULTIPLE-LAYER ELECTRO-DEPOSITION

Hisao Maeda, Tokyo-to, Akira Matsushita, Kawasaki-shi, and Takashi Sakuma, Tokyo-to, Japan, assignors to Toko Kabushiki Kaisha, Ota-ku, Tokyo-to, Japan, a joint-stock company of Japan Filed Nov. 15, 1966, Ser. No. 594,533
Claims priority, application Japan, Nov. 19, 1965, 40/71,241
Int. Cl. C23b *5/52;* G11b *5/84*
U.S. Cl. 204—37 1 Claim

ABSTRACT OF THE DISCLOSURE

A method for producing a conductor wire coated with a magnetic film comprises repeatedly electrodepositing a thin magnetic film in the circumferential direction onto a conductor wire while passing a direct current through the wire, and repeatedly subjecting the coated wire to a heat treatment while passing a direct current through the wire.

This invention relates to a process for producing wire coated with thin magnetic film (hereinafter referred to as "magnetic thin film wire") for use principally in matrix type memory elements.

In a memory element of matrix type as described hereinafter, it is desirable that the driving current be made as low as possible, and for this purpose it is preferable that the anisotropic magnetic field strength $H_k$ of the magnetic thin film of magnetic thin film wire used in the memory element be low. By the conventional processes as described hereinafter for producing magnetic thin film wire, the value of $H_k$ cannot be reduced beyond a certain limit.

It is an object of the present invention to overcome this difficulty and to provide magnetic thin film wire of very low anisotropic magnetic field strength $H_k$ thereby to afford the use of low driving current.

More specifically, an object of the invention is to provide a relatively simple process for producing magnetic thin film wire of the above stated character which has highly desirable magnetization characteristics.

According to the present invention, briefly stated, there is provided a process for producing magnetic thin film wire by multiple-layer electrodeposition which comprises at least two consecutive process stages each of which comprises electrodepositing a thin magnetic film onto the surface of a conductor wire as the magnetic film is caused to have a magnetization easy axis in the direction of an external magnetic field and heat treating the wire thus coated with magnetic film as an external magnetic field is applied thereto, whereby $H_k$ of the magnetic film is substantially decreased.

The objects and details of the invention will more clearly be apparent from the following detailed description when read in conjunction with the accompanying drawings.

Figure 1:
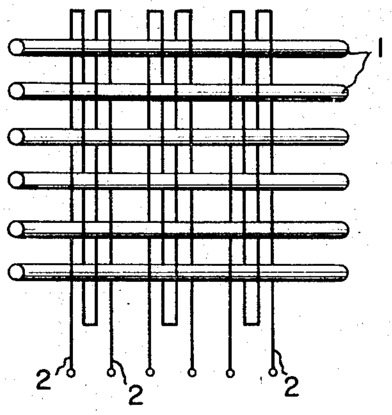
FIG. 1 is a planar diagrammatic view showing an example of the composition and arrangement of a matrix type memory element.

FIG. 1 illustrates one example of a matrix type memory element in which a magnetic thin film wire produced according to the invention can be used. This memory element is a matrix structure made up of a large number of lengths of magnetic thin film wire 1 consisting of a conductor core wire coated by electrodeposition with a magnetic thin film of a magnetic material, such as a permalloy, and a large number of lengths of conductor wire 2 disposed to cross the lengths of magnetic thin film wire 1.

Figure 2:
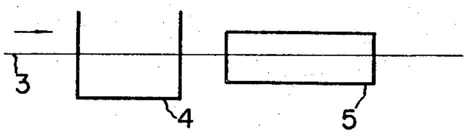
FIG. 2 is a schematic side elevational view indicating an example of a process for electrolytically applying a single layer of magnetic film on a magnetic thin film wire.

The conventional process of electrodepositing the magnetic thin film on the core wire comprises, as indicated in FIG. 2, electrodepositing a magnetic material to a specified thickness on a conductor wire 3 in an electrodeposition vessel 4 as the wire 3 is exposed to an external magnetic field, the conductor wire 3 having been previously washed chemically or electroplated with a metal such as copper, and passing the wire thus coated with the magnetic material through a heat-treatment furnace 5 (hereinafter referred to as a "thermal magnetization furnace") thereby to cause the magnetization easy axis of the magnetic material to be aligned well with the magnetic direction of the external magnetic field.

By this method, however, as briefly mentioned hereinbefore, the value of $H_k$ cannot be reduced beyond a certain limit even when the temperature of the thermal magnetization furnace 5 is suitably selected.

The present invention contemplates the provision of a process for producing a magnetic thin film wire having excellent magnetization characteristics whereby its $H_k$ can be reduced beyond the above mentioned limit.

The objects of the invention may be accomplished, briefly stated, by dividing the specified overall thickness of the magnetic thin film into divisions corresponding to a number of layers or laminations and carrying out a specified electrodeposition for each layer. The invention provides a process wherein there are carried out repeated electrodeposition process stages, in each of which a layer of a thickness which is a fraction of the finally required thickness is deposited.

In the electrodeposition process according to the invention, an external magnetic field is established in the circumferential direction of the conductor wire by passing a direct current through the conductor wire which has been thoroughly washed beforehand as mentioned hereinabove. Alternatively, a magnetic field is established in the wire axial direction of the conductor wire by applying a magnetic field from the outside. In either case, the magnetic material such as a permalloy is electrodeposited on the conductor wire as an external magnetic field is applied thereto, and thereafter the wire so coated is passed through a thermal magnetization furnace thereby to cause the magnetization easy axis direction of the wire coating to be aligned even better in the direction of the external magnetic field.

Figure 3:
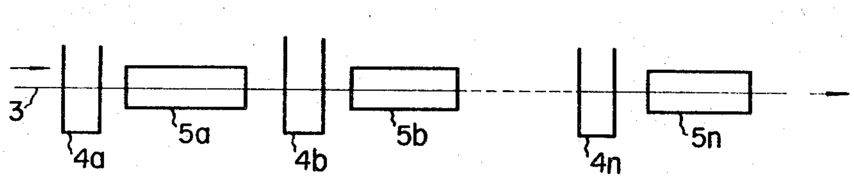
PRIOR ART FIG. 3
FIG. 3 is a view similar to FIG. 2 indicating one example of the process for electrolytically applying multiple laminar layers of magnetic film according to the invention.

The wire which has passed through the first electrodeposition stage as described above is further subjected to repeated stagse of electrodeposition of similar character until the required total film thickness is obtained. This multiple-layer electrodeposition process is illustrated by one example in FIG. 3. As shown, a conductor wire 3, cleaned beforehand, is passed through a first electrodeposition vessel 4*a* and then through a first thermal magnetization furnace 5*a* thereby to accomplish the first process stage. Thereafter, the wire is passed through successive electrodeposition vessels and furnaces $\mathbf{4}_b$, $\mathbf{5}_b$, . . . . $\mathbf{4}_n$, $\mathbf{5}_n$ until a magnetic thin film of the specified total thickness and *n* multiple layers has been formed on the wire.

An important feature of the multiple-layer electrodeposition process of the invention is that as the number of stages of the repeated electrodeposition is increased, the $H_k$ can be decreased. The values of $H_k$ attainable by the process of the invention are low compared with those attained by only a one stage process.

Furthermore, the low values of $H_k$ produced by the process of the invention cannot be attained with a single process stage even by the composite electrodeposition process wherein the flow rate of a reducing gas supplied into the thermal magnetization furnace is adjusted, and a suitable quantity of oxygen is mixed with the reducing gas thereby to change the value of $H_k$ of the electrodeposited surface layer.

In order to indicate still more fully the nature and utility of the invention, the following example of specific procedure is set forth, it being understood that this example is presented as illustrative only, and that it is not intended to limit the scope of the invention.

EXAMPLE

A Phosphor bronze wire of 0.2-mm. diameter is used as the starting material conductor wire. After the surface of this wire is chemically washed, a film of a thickness of approximately 1.0 micron of a permalloy containing 80 percent of nickel and 20 percent of iron as principal constituents is deposited on the surface of the wire by electroplating. During this electroplating step, a direct current of 1 ampere is passed through the wire to create an external magnetic field in the wire circumferential direction and thereby to impart anisotropy in the wire circumferential direction to the electroplated film.

In general, after only one stage of this process, the anisotropy of the plated film is still insufficient. Accordingly, after plating, the wire is subjected to an external heat treatment at 300 degrees C. for 30 seconds as a direct current of approximately 1 ampere is passed through the wire thereby to improve the anisotropy.

Figure 4:
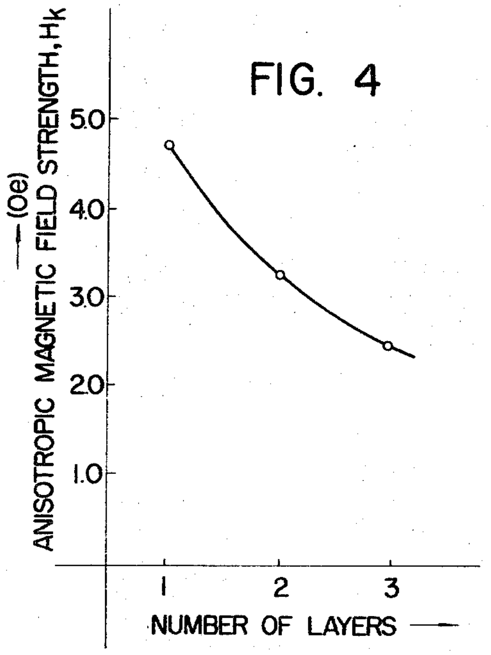
FIG. 4 is a graphical representation indicating the variation of the anisotropic magnetic field strength $H_k$ of the magnetic film of a magnetic thin film wire with the number of deposited layers in the magnetic film.

The value of the $H_k$ of a single layer of the permalloy film deposited and treated in the above described manner in an actual instance is indicated in FIG. 4. The values of $H_k$ of multiple-layer electrodeposited films produced by two and three stages of the process to obtain plated films of a final total thickness each of 1.0 micron are also indicated in FIG. 4.

As indicated in FIG. 4, the value of $H_k$ progressively decrease with increase in the number of layers of the deposited magnetic material, that is, the number of stages of treatment, even for the same total film thickness of 1 micron.

It should be mentioned that the compositions of the electrolytes, electrodeposition conditions, and other process conditions may be varied among the various stages of the process.

It should be understood, of course, that the foregoing disclosure relates to only a preferred embodiment of the invention and that it is intended to cover all changes and modifications of the example of the invention herein chosen for the purposes of the disclosure, which do not constitute departures from the spirit and scope of the invention as set forth in the appended claim.

What we claim is:

1. A process for producing a conductor wire coated with a magnetic thin film; which comprises the steps of
   - (a) electrodepositing an inner thin magnetic film having anisotropy in the circumferential direction onto a conductor wire as the magnetic film is caused to have a magnetization easy axis in the direction of an external magnetic field established by passing a direct current through said conductor wire, and
   - (b) subjecting the wire thus coated with said inner magnetic film to an external heat treatment while an external magnetic field is applied thereto by passing a direct current through said coated wire, thereby to improve said circumferential anisotropy of said coated magnetic film,
   - (c) electrodepositing an outer magnetic thin film on and around said inner film while an external magnetic field is applied thereto, and
   - (d) then subjecting the conductor wire with said inner and outer films to a heat-treatment in a magnetic field applied thereto.

References Cited

UNITED STATES PATENTS

| | | | |
|---|---|---|---|
| 2,443,756 | 6/1948 | Williams et al. | 204—37UX |
| 3,047,423 | 7/1962 | Eggenberger et al. | 204—43X |
| 3,077,442 | 2/1963 | Koretzky | 204—43X |
| 3,119,753 | 1/1964 | Mathias et al. | 204—43 |
| 3,160,576 | 12/1964 | Eckert | 148—31.55 |
| 3,239,437 | 3/1966 | Stephen | 204—43 |
| 3,027,309 | 3/1962 | Stephen | 204—43 |
| 3,374,113 | 3/1968 | Chang et al. | 340—174UX |
| 3,370,929 | 2/1968 | Mathias | 29—196.3X |

WINSTON A. DOUGLAS, Primary Examiner

M. J. ANDREWS, Assistant Examiner

U.S. Cl. X.R.

340—174